Sept. 4, 1956 A. R. SPICACCI 2,761,271
BEARING MOUNT FOR RAKE BAR
Filed March 2, 1953 2 Sheets-Sheet 1

INVENTOR
ATTILIO R. SPICACCI

BY
ATTORNEY

Sept. 4, 1956

A. R. SPICACCI 2,761,271

BEARING MOUNT FOR RAKE BAR

Filed March 2, 1953

INVENTOR

ATTILIO R. SPICACCI

BY *M. V. Gould*

ATTORNEY

United States Patent Office 2,761,271
Patented Sept. 4, 1956

2,761,271

BEARING MOUNT FOR RAKE BAR

Attilio Regulus Spicacci, Lancaster, Pa., assignor to Federal-Mogul-Bower Bearings, Inc., a corporation of Michigan Application March 2, 1953, Serial No. 339,572

2 Claims. (Cl. 56—377)

This invention relates to improvements in the bearing mountings on the tooth bars of side delivery hay rakes.

The object of the invention is to provide a bearing mounting for a tooth bar of a side delivery rake, especially of that type commonly known as the roller bar. These rakes have a number of tooth bars pivoted on pins located at the periphery of side plates whose axes of rotation are parallel and at a sharp angle with the axes of the tooth bars. By nature of the mechanical arrangement, the spring teeth carried by the tooth bar will always be orientated in the same direction towards the ground during the operation of the rake.

A further object of the invention is the elimination of overhung loads on the bearing at the end of the tooth bar.

It is a further object of the invention to so mount the bearing that a single unit bearing at each end of the tooth bar will serve to take both the thrust and radial loads due to the reactions of the tooth bar loads.

A still further object of the invention is to locate the center of the bearing at the intersection of the axis of the pin and that of the tooth bar.

A further object of the invention is to substitute a unit bearing at the end of the tooth bar for the conventional double bearing mounting heretofore employed.

A further object of the invention is to provide for a comparatively simple means of connecting the end of the tooth bar to the pivot bearing, said means being adjustable within limits to provide for any uneven length of the tooth bars.

A further object of the invention is to provide an effective seal for the bearing against the entrance of dirt or water and to prevent the leakage of grease from the bearing.

The invention is illustrated in the accompanying drawings in which.

Figure 1:
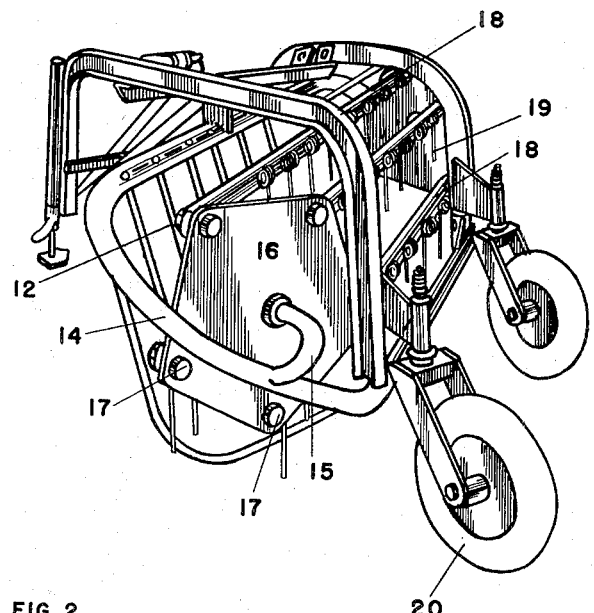
Figure 1 is a view of the particular type of side delivery hay rake to which the invention is applicable.
Figure 2:
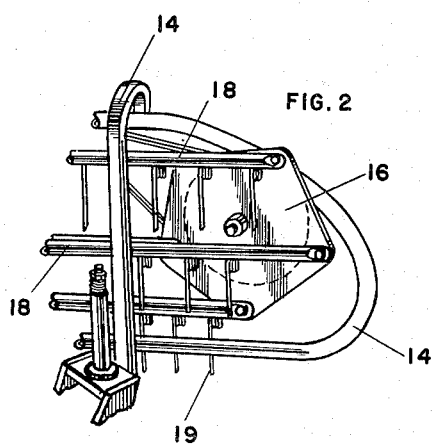
Figure 2 is a fragmentary view of the rakes showing the tooth bars mounted on the end plates.

Referring particularly to Figures 1 and 2, a side delivery hay rake 12 is shown in working position attached to a tractor. This particular type of hay rake is provided with a framework 14 on which are mounted stub axles 15 supporting parallel end plates 16. The end plates here shown five-sided, but could be any desired shape from triangular to circular and could support any desired number of tooth bars. A number of bearing supporting pins 17 are carried in equally spaced relation at the periphery of the end plates to which the tooth bars are attached. Tooth bars 18 to which are attached at spaced intervals the hay raking teeth 19 are attached to the pins through a bearing and an adjustable mounting, hereafter described. Suitable means for rotating the plates 16, such as belts, gears or chains are connected to the motive power of the tractor or taken off the wheel 20. As this forms no part of the invention and is conventional construction, description and drawings of this driving means are omitted.

Figure 4:
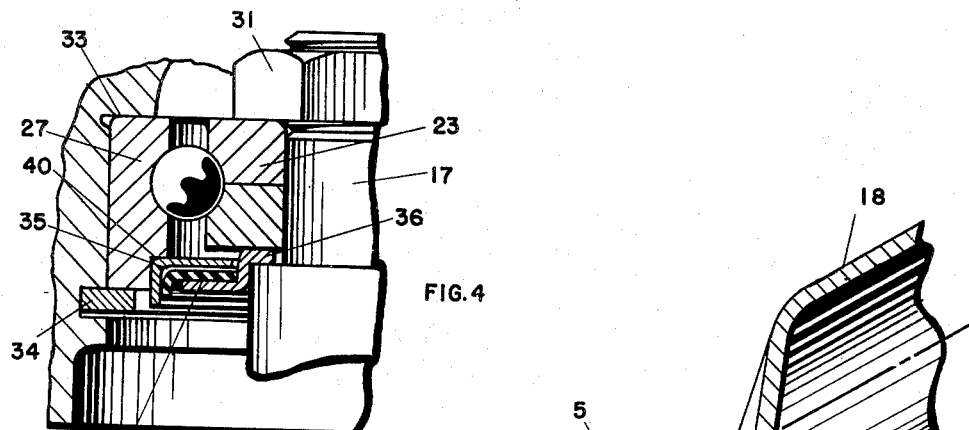
Figure 4 is a fragmentary view of the bearing, partly in section showing the seal.
Figure 3:
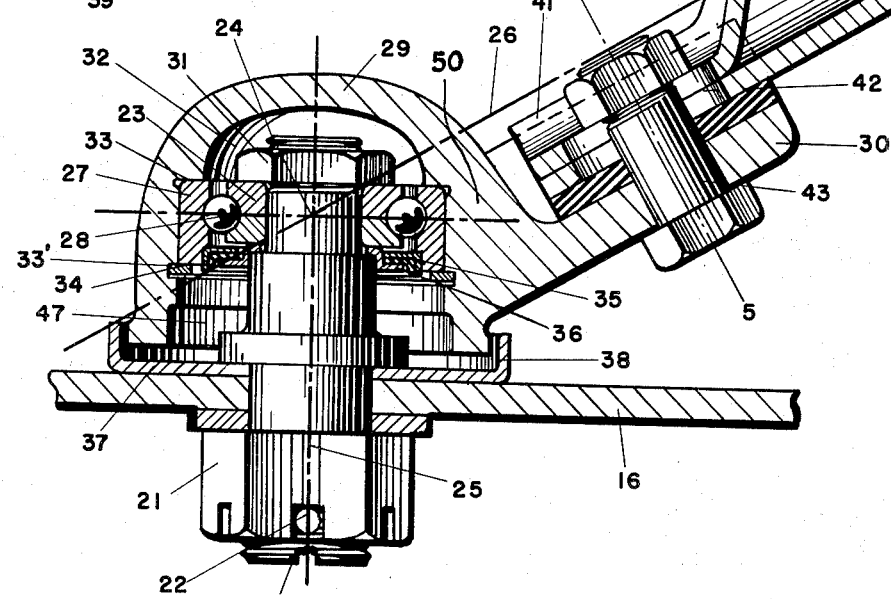
Figure 3 is a fragmentary view showing a cross section of the bearing mounting and also showing the attached tooth bar.
Figure 5:
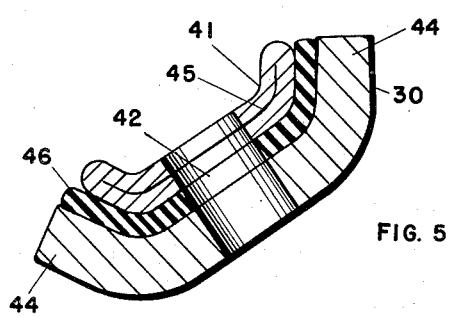
Figure 5 shows the adjustable resilient mounting for the tooth bar with the bearing, being a cross-section on line 5—5 of Figure 3.

Referring now to Figures 3, 4, and 5, the pins 17 are secured to the plates by the nuts 21 which are locked in position by cotter pins 22. The pin is formed with cylindrical portions of different diameters, the largest bearing against a shield 37 which in turn is pressed against the inner side of the plate. The cylindrical portion of the smallest diameter is partially threaded to receive a nut 31 which holds a split inner ball bearing race 23 in position. The axis of rotation line 25 of the pin intersects the central longitudinal line 26 of the tooth bar at the point 24 which is the exact center of the bearing. Line 50 represents what is termed the plane of rotation of the bearing and such plane is normal to the axis 25. It will thus be seen that the plane 50 intersects axis 25 at its intersection with line 26. In the structure illustrated, the inner race 23 is split to allow a full complement of balls 28 and is firmly held against the shoulder of the second largest diameter of the cylindrical sections of the pin by said nut 31.

An outer race 27 is joined with balls 28 and inner race 23 to form a complete bearing on which is mounted a cap 29 having an extended ear 30. The cap 29 is also formed with a grease receiving chamber 32, an annular shoulder 33 engaging the upper side of the outer race and limiting the outward movement of the cap with relation to the bearing, and a groove 33' adapted to receive a snap ring 34, which engages the outer side of the outer race thus holding the cap against longitudinal movement with respect to the bearing. The ear 30 of the cap is formed with upturned edges 44, being similar to the upturned edges 41 of the flattened end portion 45 of the tooth bar. A resilient pad 46 fits between the flattened end portion of the tooth bar and the similarly shaped part of the ear 30 and provides together with the slot 42 in the tooth bar an adjustable resilient coupling between the cap 29 and said tooth bar.

To effectively seal the bearing against the entrance of dirt and moisture and to prevent the loss of lubrication from the bearing, a shield 35, a slinger 36 and a dust cap 37 are provided. Shield 35 is formed with an outturned rim which fits into a cutout portion of the inner wall of the outer race and against the shoulder 40 of said race, the rim of said shield projecting below the outer race. Slinger 36 is held between the inner race and the shoulder of the intermediate cylindrical section of the pin and is bent to underlie the shield 35. A rubber sealing washer vulcanized or securely attached to the flat surface of the slinger 36 extends outward to engage the inner face of the rim of shield 35. This effectively retains the grease and prevents the entrance of dirt or moisture. A dust cap 37 formed with an upstanding rim 38 fits between the pin and the plate to assist in keeping the bearing clean by preventing the entrance of small stones and larger particles of matter. The space 47 located between the shield and the dust cap 38 is made possible by the use of the single row bearing and allows a packing material, such as grease or the like, to be used to prevent the entrance of dirt and moisture.

In the operation of the side delivery hay rake the plates 16 are rotated about the stub axles, this rotation causing the tooth bars to rotate with the plates. It being necessary to keep the teeth of the tooth bars vertical to the ground to perform the raking operation, the bars must rotate about the pins 17. Because of unevenness of the ground and the ofttimes uneven distribution of the load, there are different forces imposed on the tooth bar. The location of the bearing at the point of intersection of the longitudinal axis of the tooth bar and the center line of the bearing supporting pin eliminates the overhung load which was formerly present (with the different bearing construction) and promotes free rotation and long bearing life.

The use of a single row bearing, the center of which is located at the intersection of the center line of the pin with the longitudinal center line of the tooth bar, permits a certain amount of flexibility and give to the bearing without undue wear. In order to permit the rotation of the tooth bar about the pin it is necessary that the bearing be located away from the plate. This extra distance provides the space 47 which permits the inclusion of a suitable packing material, such as grease, to prevent the entrance of dirt and moisture to the bearing.

What is claimed is:

1. In a mechanism having parallel rotatable end members in which the facing surfaces are rotatably connected to elongated bars, material engaging tines mounted on said bars, means rotatably interconnecting each end of said bar with its adjacent end member, said means comprising a pivot shaft mounted on one of said end members and having its pivot axis substantially parallel to the axis of rotation of said one of said end members, the central longitudinal axis of said bar intersecting said pivot axis at an angle other than 90° with respect thereto, a bearing unit interposed between said bar and end member and connected thereto to provide a pivot connection therebetween, said bearing unit having its plane of rotation substantially normal to said shaft axis and passing through the point of intersection of shaft axis and said axis of said bar, and said tines being in a plane which passes through said point of intersection.

2. In a mechanism having parallel rotatable end members in which the facing surfaces are rotatably connected to elongated bars, material engaging tines mounted on said bars, means rotatably interconnecting each end of said bar with its adjacent end member, said means comprising a pivot shaft mounted on one of said end members and having its pivot axis substantially parallel to the axis of rotation of said one of said end members, the central longitudinal axis of said bar intersecting said pivot axis at an angle other than 90° with respect thereto, a single bearing unit interposed between said bar and end member and connected thereto to provide a pivot connection therebetween, said bearing unit having its plane of rotation substantially normal to said shaft axis and passing through the point of intersection of shaft axis and said axis of said bar, and said tines being in a plane which passes through said point of intersection.

References Cited in the file of this patent

UNITED STATES PATENTS

| | | |
|---|---|---|
| 2,022,252 | Miltenberger | Nov. 26, 1935 |
| 2,603,933 | Shore | July 22, 1952 |
| 2,620,242 | Beatty | Dec. 2, 1952 |
| 2,621,465 | Klemm | Dec. 16, 1952 |